(12) United States Patent
Roberts et al.

(10) Patent No.: US 12,730,552 B1
(45) Date of Patent: Sep. 8, 2026

(54) COMPUTER DESKTOP FLEXIBLE LAYOUTS

(71) Applicant: United Services Automobile Association, San Antonio, TX (US)

(72) Inventors: David W. Roberts, Helotes, TX (US); Aaron Quade, San Antonio, TX (US); Steven D. Sternitzke, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 28 days.

(21) Appl. No.: 18/420,457

(22) Filed: Jan. 23, 2024

Related U.S. Application Data

(63) Continuation of application No. 17/094,392, filed on Nov. 10, 2020, now Pat. No. 11,914,849, which is a continuation of application No. 16/159,229, filed on Oct. 12, 2018, now Pat. No. 10,860,188, which is a continuation of application No. 14/825,996, filed on Aug. 13, 2015, now Pat. No. 10,133,461.

(60) Provisional application No. 62/041,837, filed on Aug. 26, 2014.

(51) Int. Cl.

| | |
|---|---|
| ***G06F 3/04845*** | (2022.01) |
| ***G06F 3/04817*** | (2022.01) |
| ***G06F 3/0482*** | (2013.01) |

(52) U.S. Cl.
CPC ...... *G06F 3/04845* (2013.01); *G06F 3/04817* (2013.01); *G06F 3/0482* (2013.01); *G06F 2203/04803* (2013.01)

(58) Field of Classification Search
CPC ............. G06F 3/04845; G06F 3/04817; G06F 3/0482; G06F 2203/04803
See application file for complete search history.

(56) References Cited

U.S. PATENT DOCUMENTS

| | | | | |
|---|---|---|---|---|
| 9,210,262 | B1 | 12/2015 | Koster et al. | |
| 9,275,476 | B1 * | 3/2016 | Killalea | G06T 11/001 |
| 9,489,657 | B2 * | 11/2016 | Chudge | H04L 51/043 |
| 2004/0066414 | A1 | 4/2004 | Czerwinski et al. | |
| 2005/0278654 | A1 * | 12/2005 | Sims | G06Q 10/10 715/792 |
| 2006/0277482 | A1 | 12/2006 | Hoffman et al. | |

(Continued)

*Primary Examiner* — John T Repsher, III
(74) *Attorney, Agent, or Firm* — Plumsea Law Group, LLC

(57) ABSTRACT

A method for enhancing interaction between a customer and a customer service representative of a company is provided. A graphical user interface (GUI) of a windows control tool is displayed. A type of an interaction between the customer and the customer service representative at a computer operated by the company is determined. One or more applications associated with the type of interaction are launched based on a predetermined display layout associated with the type of interaction. One or more application windows corresponding to the launched applications are arranged on a screen based on the predetermined display layout associated with the type of interaction. The windows control tool is configured to control the one or more application windows based on customer service representative's input. The GUI of the windows control tool displays a plurality of window objects corresponding to the one or more launched applications.

17 Claims, 12 Drawing Sheets

(56) References Cited

U.S. PATENT DOCUMENTS

| | | | |
|---|---|---|---|
| 2009/0183237 | A1 | 7/2009 | Cortes et al. |
| 2011/0010173 | A1* | 1/2011 | Scott ...................... G10L 21/10 704/235 |
| 2011/0072370 | A1 | 3/2011 | Mitchell et al. |
| 2012/0072440 | A1 | 3/2012 | Vasquez et al. |
| 2013/0073473 | A1 | 3/2013 | Heath |
| 2013/0275862 | A1 | 10/2013 | Adra |
| 2014/0089822 | A1* | 3/2014 | Wu .................... G06F 3/04817 715/761 |
| 2014/0104372 | A1* | 4/2014 | Calman ................... H04N 7/15 348/E7.084 |
| 2014/0282217 | A1 | 9/2014 | Musa et al. |
| 2015/0098561 | A1* | 4/2015 | Etison ............. G06Q 10/06398 379/265.06 |
| 2015/0205453 | A1* | 7/2015 | Carlos ................ H04L 65/4015 715/788 |

* cited by examiner

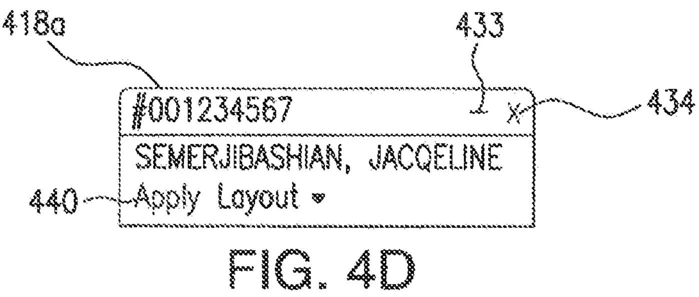
FIG. 4D
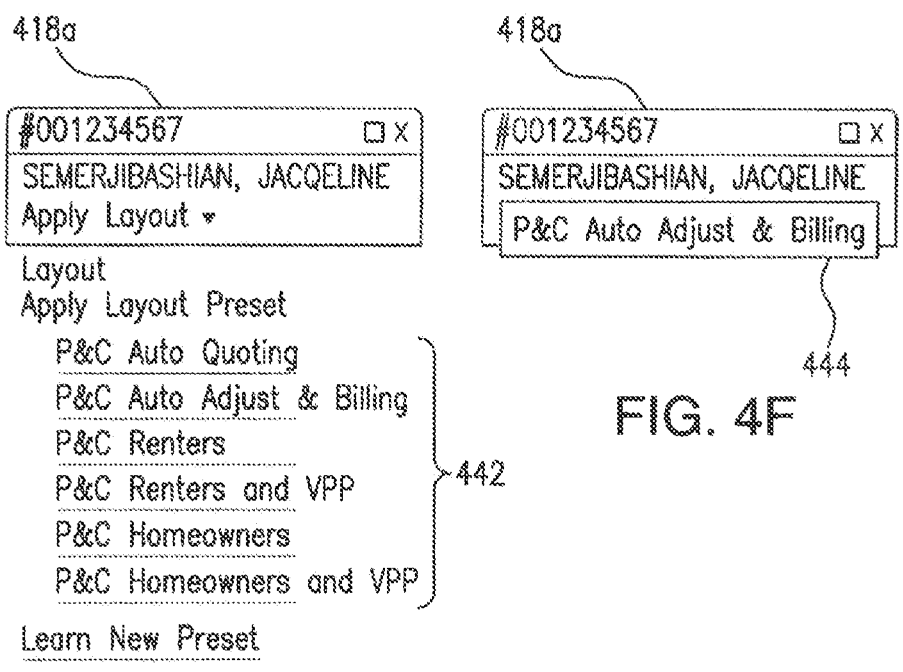
FIG. 4E
FIG. 4F

COMPUTER DESKTOP FLEXIBLE LAYOUTS

CROSS REFERENCE TO RELATED APPLICATIONS

This application is a Continuation of U.S. patent application Ser. No. 17/094,392 filed Nov. 10, 2020, which is a is a Continuation of U.S. patent application Ser. No. 16/159,229 filed Oct. 12, 2018, which is a Continuation of U.S. patent application Ser. No. 14/825,996 filed Aug. 13, 2015, which claims priority to U.S. Patent Application No. 62/041,837, which are incorporated herein by reference in their entirety.

FIELD OF THE INVENTION

The present technology relates to improving customer interactions, and more particularly, to utilizing a predetermined layout to launch, size and position relevant application windows on a customer service representative's desktop during an interaction between a customer and the customer service representative.

BACKGROUND OF THE INVENTION

Customer service representatives are often responsible for a wide variety of tasks. In addition to being proficient in accomplishing particular tasks like updating addresses or other status changes, providing new or updated quotes, responding to billing inquiries, cancelling and renewing services, and entering data related to the customer, the customer service representative is expected to be more than cordial, pleasant, engaging and generally charming.

To support customer service representatives, each has a workstation. The customer service representative relies on their workstation to provide them with information quickly in order to maintain conversational flow with the customer. Despite tremendous computing power and the latest technology, delays are inevitably introduced by the support technology. Customer service representatives are typically expected to manage multiple applications running simultaneously on their workstation. When a sufficient number of application windows are created and shown on the workstation's display, the display may become confusingly cluttered, thereby making the workstation harder to use. Additional delays are also created by the customer service representative, whether it be the customer service representative's natural speech cadence, thought process, deliberation over an application selection, or simple consideration of what to say or type next.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a computer-implemented method for enhancing interaction between a customer and a customer service representative of a company is provided. A graphical user interface (GUI) of a windows control tool is displayed. A type of an interaction between the customer and the customer service representative at a computer operated by the company is determined. One or more applications associated with the type of interaction are launched based on a predetermined display layout associated with the type of interaction. One or more application windows corresponding to the launched applications are arranged on a screen based on the predetermined display layout associated with the type of interaction. The windows control tool is configured to control the one or more application windows based on customer service representative's input. The GUI of the windows control tool displays a plurality of window objects corresponding to the one or more launched applications.

In another aspect, a computer program product for enhancing interaction between a customer and a customer service representative of a company is provided. The computer program product comprises one or more computer-readable storage devices and a plurality of program instructions stored on at least one of the one or more computer-readable storage devices. The plurality of program instructions includes program instructions to display a graphical user interface (GUI) of a windows control tool. The plurality of program instructions further includes program instructions to determine a type of an interaction between the customer and the customer service representative at a computer operated by the company. The plurality of program instructions further includes program instructions to launch one or more applications associated with the type of interaction based on a predetermined display layout associated with the type of interaction. The plurality of program instructions further includes program instructions to arrange on a screen one or more application windows corresponding to the launched applications based on the predetermined display layout associated with the type of interaction. The windows control tool is configured to control the one or more application windows based on customer service representative's input. The GUI of the windows control tool displays a plurality of window objects corresponding to the one or more launched applications.

BRIEF DESCRIPTION OF THE DRAWINGS

So that those having ordinary skill in the art, to which the present embodiments pertain, will more readily understand how to employ the novel system and methods, certain illustrated embodiments thereof will be described in detail herein-below with reference to the following drawings.

FIGS. 4D-4F are views showing how the customer service representative may apply a predetermined layout during an interaction with a customer in accordance with an exemplary embodiment.

DETAILED DESCRIPTION OF CERTAIN EMBODIMENTS

Figure 1:
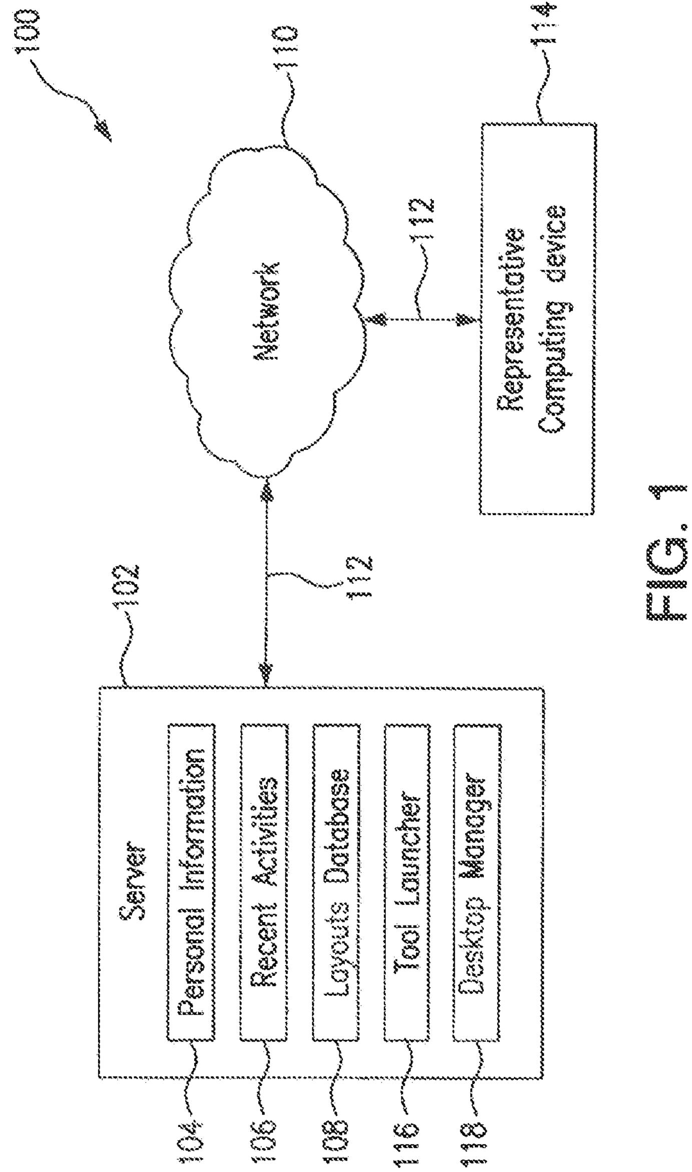
FIG. 1 is an exemplary system for streamlining customer interactions in accordance with an exemplary embodiment.

The below illustrated embodiments are directed to improving customer interactions by utilizing a windows control tool configured to control one or more application windows based on customer service representative's input. The GUI of the windows control tool displays a plurality of window objects corresponding to the one or more launched applications.

It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art.

By way of example, the following description relates to a company that provides a broad array of financial services such as insurance, banking, health insurance, tax advice, investments, automobile buying and financing, retirement planning, consumer shopping, real estate and the like. As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, the term "insurance policy" may encompass a warranty or other contract for the repair, service, or maintenance of insured property. As used herein, "insured property" means a dwelling, other buildings or structures, personal property, or business property, as well as the premises on which these are located, some or all which may be covered by an insurance policy.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the certain embodiments described herein. Thus the certain embodiments are not to be understood to be limited by what has been particularly shown and described, except as indicated by the appended claims.

Embodiments of the present invention include a method, system, and computer program product that can be used in call centers and/or other environments where conversations take place between customers and service representatives employed by a company to provide customer service. The system and method described herein electronically facilitate presentation, grouping and management of numerous software programs utilized for augmentation of conversations taking place between customer service representatives and one or more customers. In some embodiments, a plurality of interaction specific layouts is utilized to improve institution's business processes and to reduce the chances of a servicing error. Advantageously, the electronic system described herein enables flexible comparison of information that may be relevant during customer service representative's discussion with one or more customers.

Referring to FIG. 1, a hardware diagram depicting a system 100 in which the processes described herein can be executed is provided for exemplary purposes. In one embodiment, system 100 includes a server 102 communicating with a representative computing device 114 across a network 110 with communication channels 112. The server 102 stores personal information 104 about customers, recent activities data 106 related to the customers and a layouts database 108, which includes information about various business area specific layouts the system 100 may offer. In one exemplary embodiment, the server 102 may execute a windows control tool, referred to hereafter as a desktop manager 118, in combination with a tool launcher 116.

For exemplary purposes only, personal information 104 about customers may include the customer's legal name, what name they preferred to be called by, names of their family members (including former family members such as ex-spouses), ages for the customer and their family, how the customer is eligible for coverage (if applicable). The personal information 104 includes information necessary to perform authentication of the customer. The authentication information may include one or more voice samples, caller identification numbers, hardware-specific data related to one or more mobile devices associated with the customer, media access control (MAC) address, and the like.

Recent activities data 106 by the customer may include the customer enrolling in a service that the company offers (e.g., mortgage, automobile loan, auto/home/life insurance, banking, and credit card), changing the settings of a service already enrolled in (e.g., raising the deductible and lowering the premium of an auto insurance policy), calling the company to ask a question and/or discuss a topic, researching information on the company's website, and/or researching information on the internet and later visiting the company's website (e.g., wherein the company's servers may glean past Internet activities based on "cookies").

The layouts database 108 includes information related to the customer service representative's personalized layouts corresponding to various services that are offered by the company. Such information may include the details related to opening, sizing and positioning of application windows needed to handle an interaction with one or more customers. For example, if a company offers credit card services, mortgage services, banking services, automobile loan services, investment services, insurance services and housing services, the layouts database 108 may include a plurality of distinct layouts for each of those services. It should be noted that customized layouts may fall into one of several categories, including unit level customizations (i.e., customizations that apply to all users of a deployment unit), business area customizations (i.e., customizations that apply to specific business areas), and user customizations (i.e., customizations that apply to a single user). It is further noted that in some embodiments representatives' personalized layouts stored in the layouts database 108 may include multiple levels of customizations. For example, a certain type of layout may include both service representative's business area customizations and personalized customizations that apply only to that particular service representative.

At least some embodiments of the present invention may employ Virtual Desktop Infrastructure (VDI). VDI is an adaptation of the currently predominant commercial technology trend of platform virtualization (commercially referred to as "machine virtualization"). Abstractly, platform virtualization allows an operating system to run with a degree of separation (often over a network) from the underlying physical computing platform. In practical terms, a software implementation or emulation of a computer is used to execute programs in the same way programs would execute on a hardware computer and its operating system. The software implementation or emulation of a computer in such a context is referred to as a "virtual machine" (VM). There are many adaptations, extensions, and usage nuances of the virtualization concept in computing. Many of these have commercial implementations that can provide (or claim to provide) substantially improved efficiency, maintenance, reliability, and access to computer users within an enterprise Desktop virtualization is the concept of separating a personal computer desktop environment from the physical machine through a client-server computing model. The resulting "virtualized" desktop is stored on a remote central server, instead of on the local storage of a remote client; thus, when users work from their remote desktop client, all of the programs, applications, processes, and data used are kept and run centrally, allowing users to access their desktops on any capable device. Accordingly in various embodiments, the representative computing device 114 may comprise a traditional personal computer, notebook computer, smartphone, or thin client connected to one or more display devices.

In one embodiment, the desktop manager 118 includes all the necessary programming to allow the enhanced manipulation of all application windows and/or dialog windows presented on a "virtualized" desktop in accordance with a selected predetermined layout. The desktop manager module 118 may include a GUI along with other software routines and components for presenting information in accordance with personalized preferences of customer service representatives. The desktop manager 118 components discussed below with reference to FIG. 2 may be stored and managed as dynamically linked libraries in a directory.

The tool launcher module 116 is capable of launching relevant applications and sharing the launched applications with representative computing device 114. The tool launcher module 116 can be configured to notify the desktop manager 118 of a successfully started application.

Figure 2:
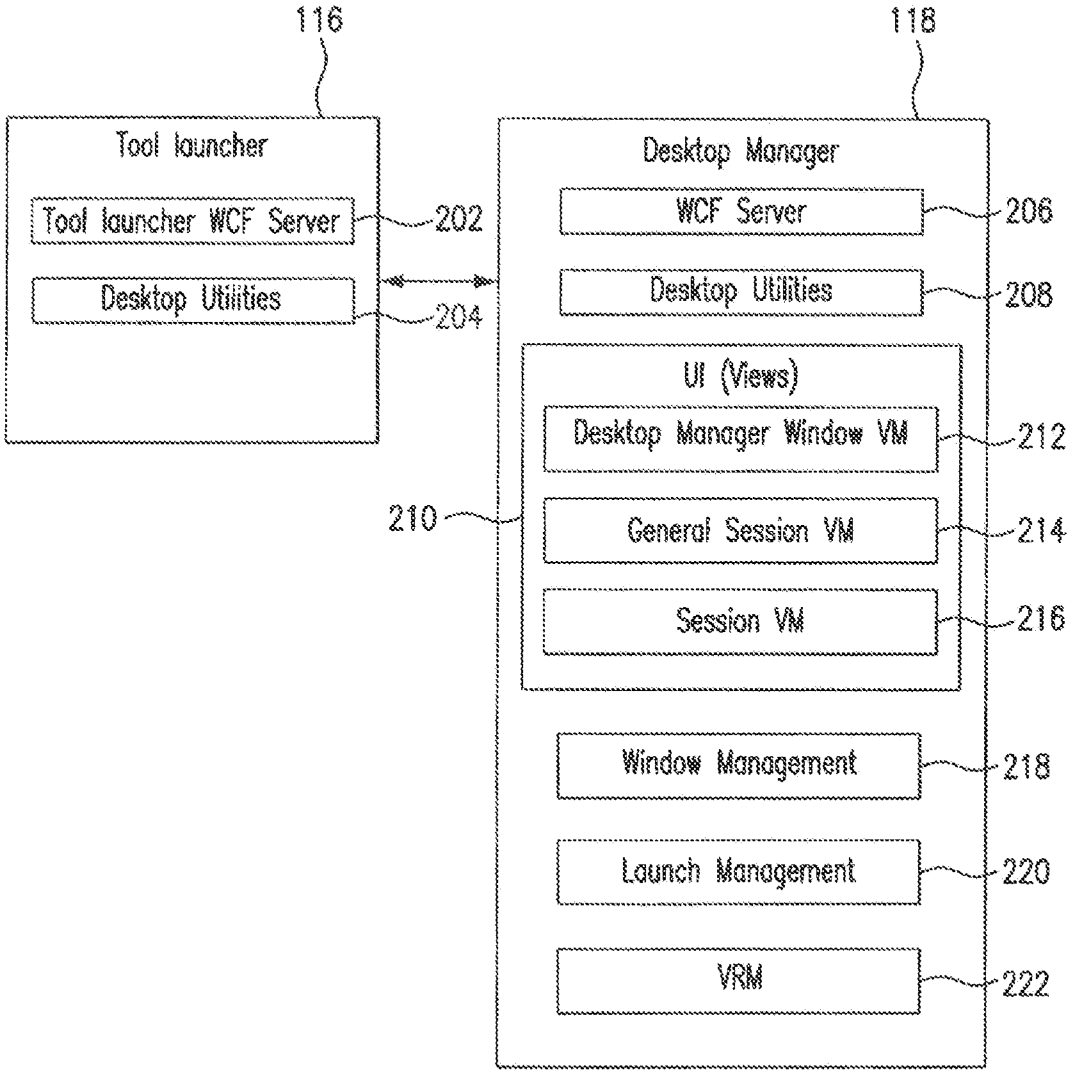
FIG. 2 is a more detailed diagram showing key components of the system shown in FIG. 1 in accordance with the exemplary embodiment.

Turning now to FIG. 2, illustrated therein is a more detailed diagram showing key components of the system 100 shown in FIG. 1 in accordance with the exemplary embodiment. The desktop manager 118 may be configured to communicate with the tool launcher 116 using service oriented architecture. In one embodiment, the service oriented architecture in the system 100 may be implemented using Windows Communication Foundation (WCF). WCF typically ensures interoperability with other WCF applications running on same machine or different machines or standard web services built on platforms such as Java, or other operating platforms. Accordingly, as shown in FIG. 2 both the desktop manager 118 and tool launcher 116 modules may include respective WCF server components 206 and 202 thus enabling communications between them.

In addition, both the tool launcher 116 and desktop manager 118 modules may include respective instances of desktop utilities components 204 and 208 containing a library of commonly used software utilities. Examples of such utilities include data logger, virtualized clients of other system components, and the like. In various embodiments, the tool launcher 116 may be responsible for launching specified applications and for providing notifications of new application launches to the desktop manager 118. In various embodiments, the tool launcher 116 may implement both synchronous and asynchronous methods that return relevant launch information including, but not limited to, GUID that uniquely identifies the launched application. In one embodiment, the tool launcher 116 may maintain a list of launched applications that are still running within the virtualized desktop environment.

Within a development environment, the desktop manager 118 can be developed using modeling systems. In one embodiment, the desktop manager 118 can be implemented using the model-view-viewmodel (MVVM) architecture. Applications built using the MVVM architecture typically include three different types of components-models, which store data as application data; views, which display a user interface; and viewmodels, which exposes the models to the view, by triggering events (e.g., events triggered by user interaction with one or more views) and invoking corresponding changes in one or more viewmodels. When changes occur in a model, the model can update its views via the viewmodel. Data binding can be used for data transport between a view and its associated viewmodel.

In one embodiment, the desktop manager 118 preferably includes a GUI component 210 operable to allow company's customer service representatives to interface with at least a portion of the "virtual" desktop environment for any suitable purposes, such as using a plurality of suitable applications to handle customer interactions. More specifically, the UI component 210 of desktop manager 118 may contain a plurality of view models, such as, but not limited to, DesktopManagerWindowVM 212, GeneralSession VM 214, SessionVM 216, and the like. In an illustrative embodiment, DesktopManagerVM 212 may comprise a parent view model for the entire UI component 210. In other words, the DesktopManagerVM 212 may contain logical structure and the core program code for the entire desktop manager application 118.

In one embodiment, the GeneralSession VM 214 may be employed to manage multiple session objects related to different generic applications. Each of the session objects may store session data defining a state of interaction with a user (i.e. customer service representative). The session data defines the current conversational state between the user and particular applications. In one embodiment, GeneralSessionVM 214 manages a grouping of all session objects representing substantially all application windows that are not associated with a particular customer. For example, GeneralSessionVM 214 may contain session objects related to a "calculator" application.

In one embodiment, the SessionVM 216 may represent a session corresponding to a particular customer currently interacting with the customer service representative. For example, if a particular portal application is running in a virtualized desktop environment, the session data may define the state of the corresponding application windows and/or the state of the web pages opened in the representative's web browser. In other words, the SessionVM 216 may manage session objects related to the grouping of all opened customer-specific application windows.

According to a preferred embodiment, the desktop manager 118 is configured to arrange relevant application windows based on a predetermined layout. Furthermore, the windows are preferably arranged to allow the customer service representative to interact with each application window separately. Typically, desktop environments implement different display states of each application window. The most common display states of application windows are maximized, minimized, and normal. A maximized display state of an application window can be when the dimensions of the window have been altered to span the length and width of the entire display screen. A minimized display state can be when the application window is no longer displayed in the display screen and only a visual control is left to alter the display state of the application window. A normal display state can be when the application window occupies less than the screen size, where it can be positioned and sized within the screen based upon representative's input (i.e., dragging a corner of a window to size it or moving an adjustable window to a desired position using a mouse). When a minimized window is activated by a representative via the desktop manager 118, it is typically returned to its previous state, which can be either a maximized or a normal state. A maximized window can be shifted to a normal state, which uses any previously established settings for the adjusted state with regard to window position and size.

Managing the application windows in a desktop environment can become rather difficult when many application windows are open at the same time. It is noted that at least in some embodiments more than one physical display device may be connected to representative's computing device 114 thus expanding the desktop across all connected devices. The expanded desktop can be treated by the desktop manager 118 as a single display screen. In one embodiment, the desktop manager 118 may include the window management component 218 responsible for keeping track of all window states and for containing functionality related to window manipulation described above. In one embodiment, the window management component 218 may periodically evaluate the desktop environment to identify any new or destroyed windows and to keep all window states updated. As a non-limiting example, a corresponding evaluation time period may comprise 500 ms.

It is to be appreciated that once desktop manager 118 receives information regarding a user-selected layout. One or more applications associated with the user-selected layout may be launched by invoking launch management component 220. In one embodiment, launch management component 220 may capture application specific parameters. For example, launch management component 220 may associate an appropriate application definition type. It is noted that application parameter values can be created by the launch management component 220. These parameters can be associated with the corresponding application through the application definition. In one embodiment, the launch management component 220 may launch the specified applications based on corresponding application definitions. In addition, the launch management component 220 functionality may include the functionality needed to launch a layout and/or to apply a layout to existing application windows.

At least some embodiments of the present invention provide a View Relationship Manager (VRM) mechanism which allows the desktop manager 118 to create "parent" and "child" relationships between different launched applications. Accordingly, in those embodiments, the desktop manager 118 may utilize the VRM component 222 to interact with launched applications. During subsequent use of the launched applications, the VRM component 222 may monitor the current runtime state of each application and take action if the state changes. Thus, in one embodiment, the VRM component 222 may comprise a plurality of files required for implementation of the VRM methods.

Figure 4A:
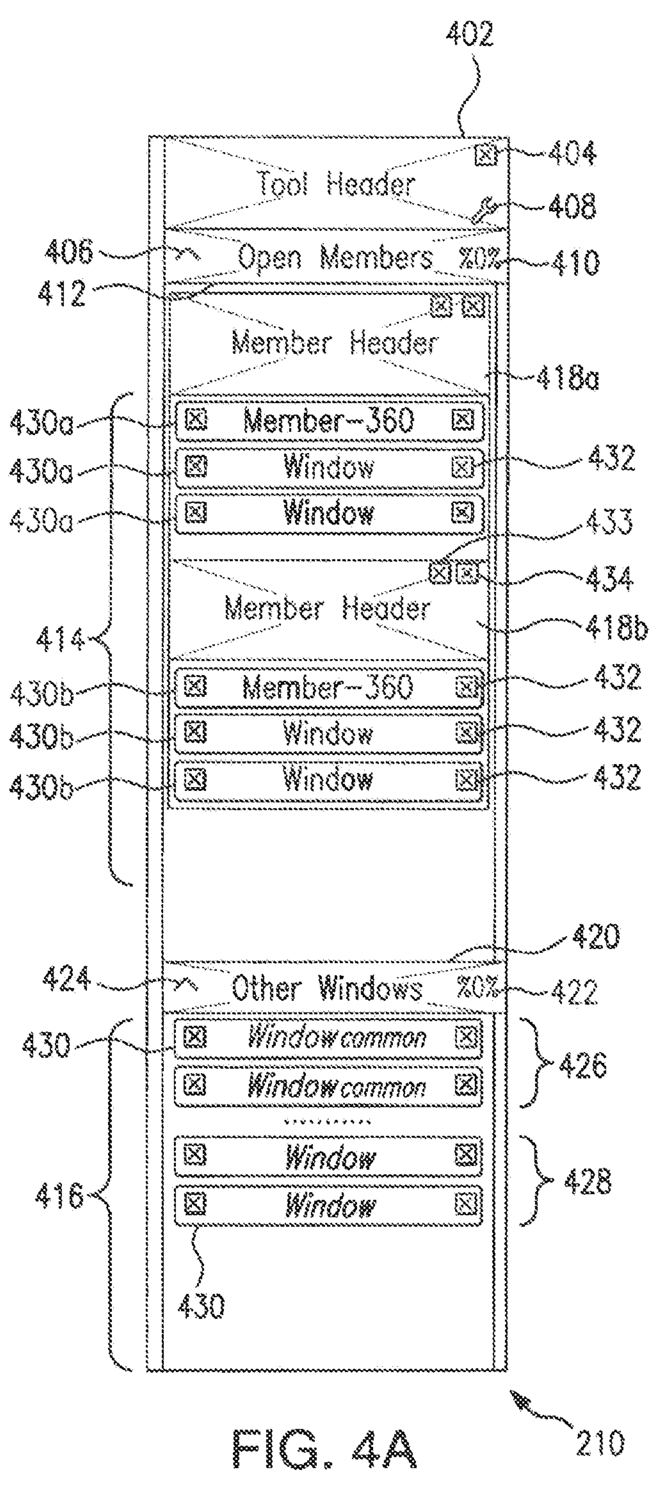
FIG. 4A illustrates components of an exemplary graphical user interface (GUI) of a windows control tool configured to control one or more launched applications in accordance with an exemplary embodiment.

FIG. 4A illustrates components of an exemplary GUI 210 of the desktop manager tool 118 configured to control one or more launched applications in accordance with an exemplary embodiment. In one embodiment, the GUI component 210 comprises a control tool header section 402, a first window group section 414 and a second window group section 416. The tool header section 402 may include a close icon 404 and user preferences icon 408. At some point a situation may arise when a user (i.e. customer service representative) may desire to close the GUI component 210. The user may close the GUI component 210 by selecting the close icon 404 on the control tool header section 402 (such as an "X" icon) that corresponds to a close request for the GUI component 210, by issuing a command from a command prompt or by pressing a particular key (e.g., a function key, the "Escape" key, etc.), or any number of ways in which the desktop manager 118 is programmed to respond by exiting (closing). By clicking the user preferences icon 408 on the control tool header section 402 users may control various settings/options related to GUI component's 210 appearances, as described below in conjunction with FIG. 8.

According to an illustrated embodiment, both the first window group section 414 and the second window group section 416 may also include respective header sections 412 and 420. The first window group section 414 enables customer service representatives to control application windows that augment conversations with particular customers. Advantageously, the desktop manager 118 is configured to group these application windows in association with a corresponding member. For example, if the customer service representative interacts with two different customers simultaneously, the information presented by the GUI component 210 in the first window group section 414 may be further divided into first and second subsections. The first subsection may comprise a first group of window objects representing one or more launched applications associated with a first interaction with a first customer and a second subsection may comprise a second group of window objects representing one or more launched applications associated with a second interaction with a second customer. In the embodiment illustrated in FIG. 4A, the first subsection may include a first customer header 418*a* containing information identifying the first customer and may include the first group of window objects 430*a* associated with the first interaction. Similarly, the second subsection may include a second customer header 418*b* and the second group of window objects 430*b* associated with the second interaction.

The header 412 of the first window group section 414 may include an expander/collapse control 406 and a dynamic indicator 410 capable of displaying a number of window groups present in this section. The expander/collapser control 406 enables customer service representatives to quickly and easily control the amount of information getting presented per situation or context by either collapsing or expanding the first window group section 414 using the expander/collapser control 406.

The second window group section 416 may comprise one or more window objects representing opened applications not associated with a particular customer, such as, but not limited to a "calculator" application, a "scratchpad" application, and the like. In one embodiment, the desktop manager 118 may further classify the window objects in the second group section 416 into other categories. For example, the first subsection 426 may include all window objects that represent customer-centric applications and the second subsection 428 may include window objects that represent less frequently used applications. It is noted that in various embodiments, all window objects presented both in the first window group section 414 and the second window group section 416 may be listed according to the order in which the corresponding applications have been launched. The header 420 of the second window group section 420 may also include an expander/collapse control 424 and a dynamic indicator 422 capable of displaying a number of window groups present in the second window group section 420.

Advantageously, the GUI control 210 of the desktop manager 118 enables customer service representatives to control a group of running applications by a single click of a mouse or a similar input device. For instance, according to an embodiment of the present invention, each customer header section 418*a*-418*b* may further provide group control icons to select, maximize, minimize, and close operations with respect to the corresponding groups of applications. For instance, a customer service representative may click the maximize/minimize icon 433 to automatically maximize/minimize all application windows corresponding to window objects 430 presented in that subsection and corresponding to a particular customer. By clicking a close all icon 434, the customer service representative may advantageously close all windows that were utilized to service that particular customer. In addition, the GUI control 210 enables the customer service representative to close individual applications rather than whole group by clicking the close icon 432 presented on a window object representing that particular application 432.

Figure 3:
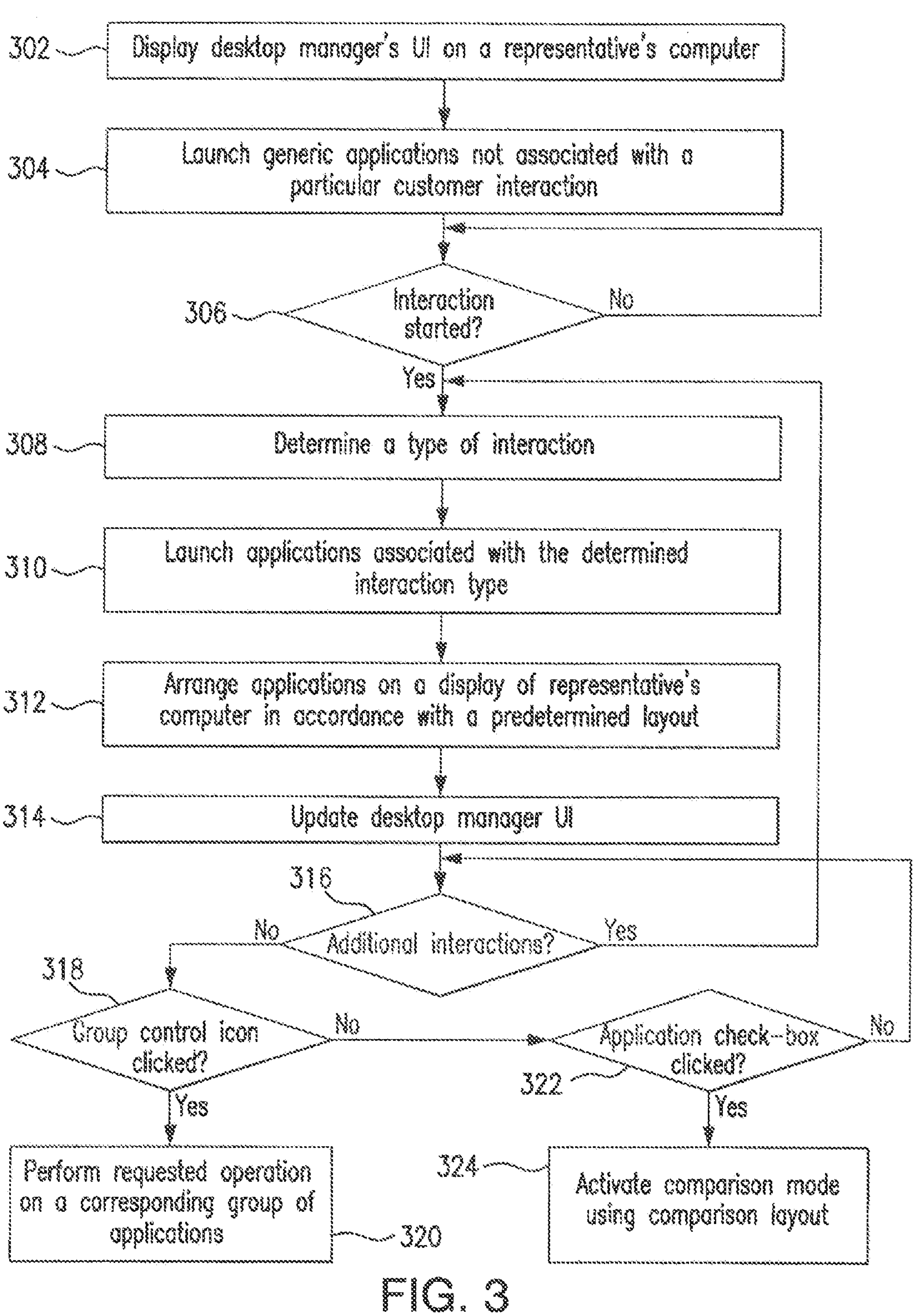
FIG. 3 is a flow chart illustrating an exemplary method of utilizing the exemplary embodiment of FIG. 1.
Figures 4B, 4C:
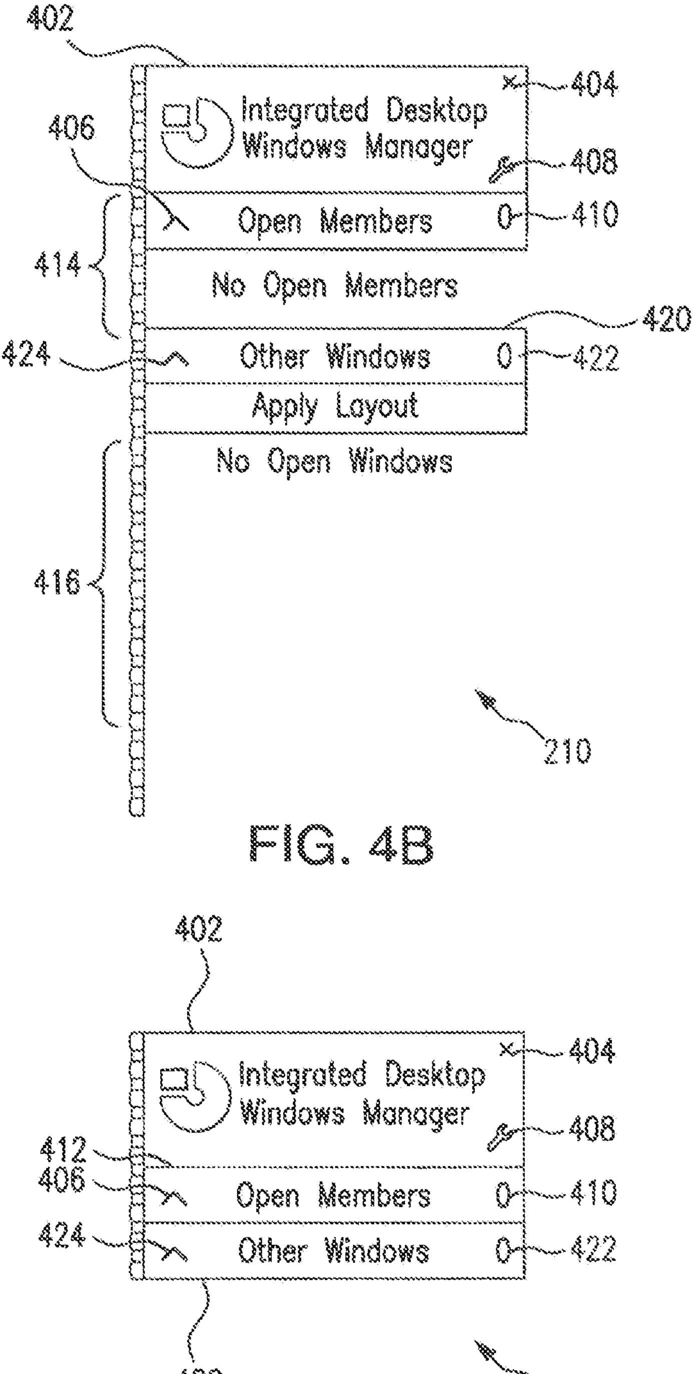
FIGS. 4B-4C illustrate exemplary screen shots of the windows control tool prior to customer service representative's interaction with a customer in accordance with an exemplary embodiment.

Turning to FIG. 3 now, illustrated therein is an exemplary process of utilizing the exemplary embodiment of FIG. 1. At step 302, the desktop manager 118 preferably loads and displays the GUI component 210 on one or more displays connected to the representative's computer 114. Desktop manager's 118 GUI component 210 creates and presents a plurality of screens related to one or more customers for review by the customer service representative. FIG. 4B illustrates an exemplary screen shot of the GUI component 210 in its initial state (prior to customer service representative's interaction with any customers), in accordance with an exemplary embodiment. As shown in FIG. 4B, initially no windows are shown in the first window group section 414 and the second windows group section 416. Accordingly, both dynamic indicators 410 and 422 show values of 0 (zero) indicating to the service representative that no applications have been launched yet by the desktop manager tool 118. Referring now to FIG. 4C, the screen shot shown therein illustrates an alternative appearance of an initial state of the GUI component 210, according to another embodiment of the present invention. In this case only headers 412 and 420 of the first window group section 414 and the second window group section 416 respectively are visible to the service representative because both of these sections are initially in a collapsed state. However, the service representative is enabled to expand either section by using a corresponding expander/collapser control 406 and 424.

In one embodiment, at 304, the desktop manager 118 may launch one or more generic applications not associated with a particular customer interaction, such as, but not limited to a "calculator" application, a "scratchpad" application, web browser and the like. In this illustrative embodiment, the desktop manager 118 may coordinate the launch of these applications with the tool launcher 116 as described above with respect to FIGS. 1 and 2. At 306, the desktop manager 118 may wait until it determines that an interaction between the customer service representative and a customer has begun. In various embodiments, the interaction may be an online chat, incoming call by the customer, the customer service representative being prompted to call the customer and the like. For ease of explanation only, the interaction is referred to hereinafter, as a telephonic interaction.

According to an embodiment of the present invention, upon receiving the call from the customer, the system 100 may utilize one of the modules, such as an authentication module (not shown in FIG. 1) to verify the customer's identity and prevent fraud. The customer is initially asked typical information such as their name and/or customer number. Based on the initial information, the data relevant to the customer can be found in the personal information 104 and other locations. In some embodiments, customer's identity may be determined automatically by the system 100 and the customer's identity may be used to search and retrieve all or some of the customer account details to the representative's computer 114. This avoids the customer service representative needing to ask questions like: "What is your customer account number? Could you please spell your name? What is your birth date?" and the like. In one embodiment, customer's identity may be passed to the desktop manager 118 by the personal information component 104. In response, the desktop manager 118, may automatically render a corresponding customer header 418*a* in the first window group section 414 shown in FIG. 4A. As shown in FIG. 4D, the customer header 418*a* preferably contains information identifying the customer.

During initial stage of interaction with the customer, the customer service representative gains an understanding of the customer's needs and recognizes a type of service requested by the customer, at 308. It should be noted that typically customer service representatives utilize same applications to handle particular types of interactions. In an aspect, various embodiments of the present invention contemplate that representative's company may predetermine and create a plurality of interaction specific and/or business area specific layouts that contain information related to applications needed to be launched to handle the determined interaction type. In one embodiment, a drop-down menu 440 of the customer header 418*a* displayed by the desktop manager 418, shown in FIG. 4D, provides the customer service representative quick and efficient access to available layouts. In response to the selection of the drop-down menu item 440 by the customer service representative, the desktop manager 118 may retrieve layout information from the layouts database 108, for example. Thereupon, UI component 210 of the desktop manager 118 preferably renders a list of available layouts 442, shown in FIG. 4E, for the customer service representative to select from. An exemplary non-limiting list of layouts may include, an auto quoting layout, a renters layout, a homeowners layout, and the like. In one embodiment, in response to the customer service representative selecting a particular layout, the UI component 210 may display note 444 containing information identifying the selected interaction specific layout. In some embodiments, types of some interactions, such as incoming calls, may be determined/predicted automatically by the system 100 based on, for example, customer's interaction with company's website/portal and the determined interaction type may be used by the desktop manager 118 and/or other component of system 100 to search and retrieve all of the layout details from the layouts database 108.

Referring again to FIG. 3, at 310, the desktop manager 118 may cooperate with the tool launcher 116 to launch one or more applications specified in the layout selected in step 308. In other words, advantageously, various embodiments described herein enable customer service representatives to open all applications they predetermined might be needed to handle the interaction in one click, at most. Further, at 312, the desktop manager 118 may arrange launched application windows on one or more displays of the representative computing device 114 based on the information specified in the layout selected in step 308. Such information can include, without limitation, details related to size and screen position of relevant application windows in accordance with customer representative's preferences. Advantageously, at least some embodiments of desktop manager tool 118 allow multiple windows to be viewed on the same level, without the time consuming process of having to resize and position multiple windows on a desktop screen. It should be noted that layout preferences may be preconfigured for each customer service representative based on typical services provided. For example, one layout may exist for representative's auto service related interactions, another layout may exist for auto acquisitions related interactions, etc. It is envisioned that at least some service representatives may also create a configurable generic layout that may be utilized by the desktop manager 118 for some default scenarios.

In an embodiment, at 314, the desktop manager tool 118 preferably updates the UI component 210 based on operations performed at steps 310, 312. For example, for each application launched, the desktop manager 118 may render a window object 430 representing the launched application in the first window group section 414 shown in FIG. 4A. According to another aspect of some preferred embodiments, if during the interaction with the customer the service representative starts moving application windows around, resizing them, opening new application windows, closing some opened windows, and the like, they may easily reset all windows to a preferred position and size by reselecting the corresponding layout again, for example, by using the drop-down menu 440, shown in FIG. 4D. Further, in some situations, the context of the interaction with the customer may transition one or more times. For instance, if originally the calling customer needed assistance related to ATM debit card maintenance, later in the call the customer may ask a question regarding billing. In this interaction context changing situation, the desktop manager 118 allows the customer service representative to select a different layout that would cause the desktop manager 118 to open different applications and position them appropriately on the screen in accordance with the newly selected layout's specified preferences. In other words, when customer service representatives service two or more different transaction (call) types within the same transaction (call) with the same customer, advantageously, the desktop manager 118 enables the representatives to quickly and easily switch layouts with just one click depending on the current context of conversation.

Generally speaking, it is fairly common for service representatives to be speaking and dealing with multiple customers simultaneously. For instance, if a particular transaction involves a joint account, the service representative may need to conference in all of the account holders and may need to review all the information related to the account holders by using a plurality of applications. Still referring to FIG. 3, at 316, the desktop manager 118 may periodically check whether the customer service representative interacts with more than one customer. In response to determining that additional customers are involved in the interaction (step 316, yes branch), the desktop manager 118 preferably repeats steps 308-314 for each additional customer. In one embodiment, once the service representative begins interacting with a second customer, the desktop manager 118 may automatically render a corresponding customer header 418*b* in another subsection of the first window group section 414 shown in FIG. 4A, thus allowing the customer service representative to select a second layout to handle the interaction with the second customer. It should be noted that the second layout associated with the second customer maybe either the same as or may differ from the first layout associated with the first customer. Next, the desktop manager 118 may minimize currently opened windows and launch and arrange the specified application windows in accordance with the second layout.

Figure 5:
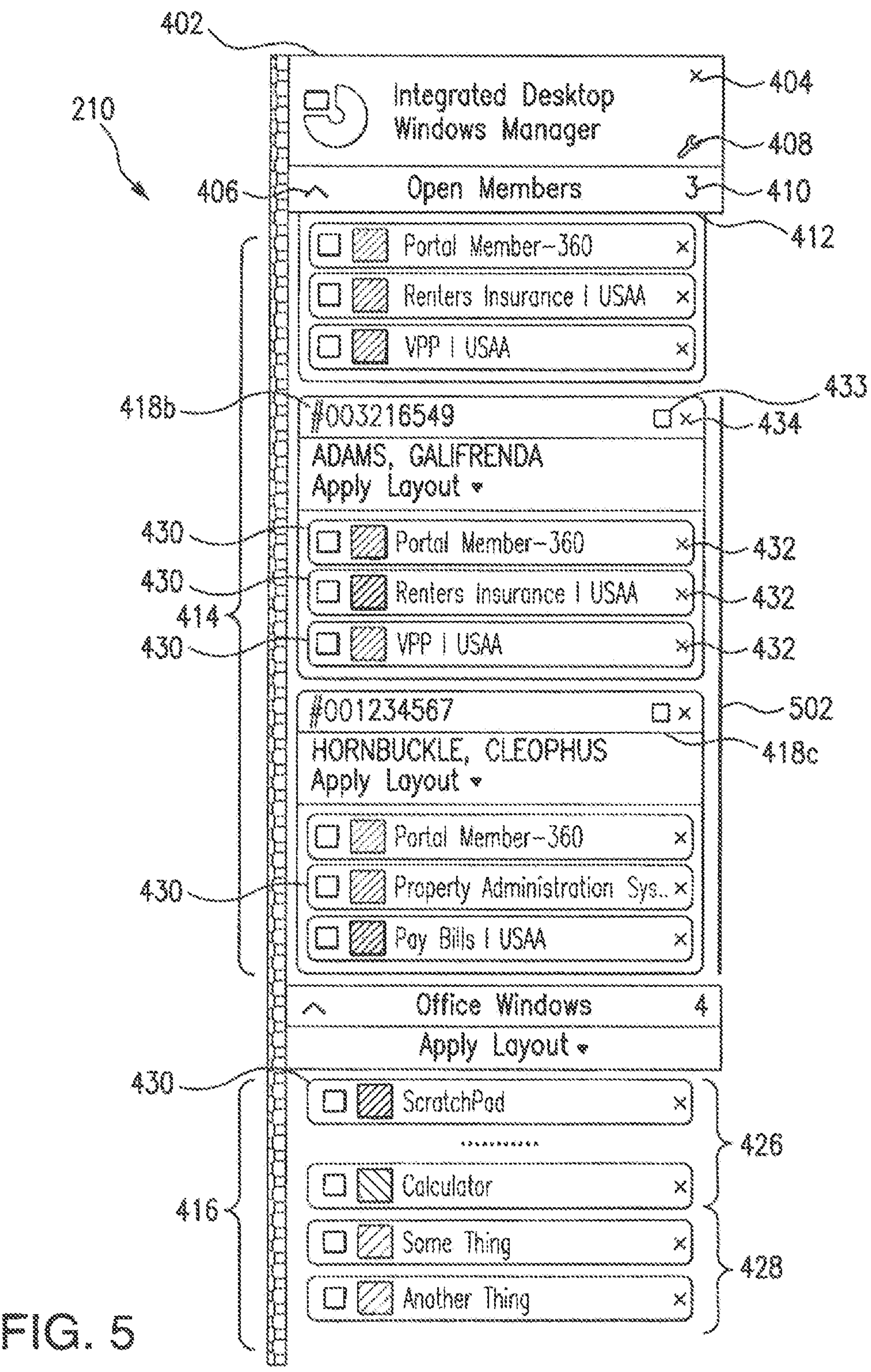
FIG. 5 is another exemplary screen shot of the windows control tool rendered during customer service representative's interaction with a plurality of customers in accordance with an exemplary embodiment.

FIG. 5 is an exemplary screen shot of the desktop manager's 118 UI component 210 rendered during a customer service representative's interaction with a plurality of customers, in accordance with an exemplary embodiment. As shown in FIG. 5, the first window group section 414 in this example presents information related to three different customers as indicated by the dynamic indicator 410. As shown in FIG. 5, the UI component 210 may include a scroll bar 502 for moving within the first window group section 414. Each subsection within the first window group section 414 contains a corresponding customer header, such as customer headers 418*b* and 418*c* in FIG. 5, containing information identifying each customer. Further, in accordance with a preferred embodiment, each respective subsection shows a plurality of window objects 430 representing all application windows opened for a respective customer. Thus, according to a preferred embodiment, the desktop manager 118, advantageously, enables customer service representatives to quickly and easily flip back and forth between different windows and/or between different customers, by selecting either a desired window object 430 or a desired customer header 418.

As shown in FIG. 5, according to an embodiment of the present invention, each customer header section 418*b*-418*c* may further provide group control icons 433, 434 to select maximize, minimize, and close operations with respect to the corresponding groups of applications. For instance, a customer service representative may click the maximize/minimize icon 433 to automatically maximize/minimize all application windows presented in that subsection and corresponding to that particular customer. By clicking a close all icon 434, the customer service representative may, advantageously, close all windows that were utilized to service that particular customer in one click. In addition, the GUI control 210 enables the customer service representative to close individual applications rather than whole group by clicking the close icon 432 presented on a window object 430 representing that particular application.

Referring yet again to FIG. 3, at 318, the desktop manager 118 may determine whether the service representative clicked any of the group control icons 433, 434. In response to determining that one of the group control icons 433, 434 has been clicked (step 318, yes branch), at 320, the desktop manager 118 preferably performs the requested operation on a corresponding group of applications. For instance, by clicking the close all icon 434 on the customer header section 418*b*, the customer service representative is able to close the entire group of applications presented within that subsection.

It should be noted that in some situations customer service representatives might need to simultaneously open multiple applications for comparison purposes. It is further noted that at least some of these applications may be related to different customers. In one exemplary scenario, a customer service representative may be discussing an insurance policy renewal with a customer and he/she may want to compare customer's old policy to a new policy and/or may want to compare customer's new policy against one or more customer's spouse's policies, etc. At least in some embodiments this comparison functionality may also be facilitated by the desktop manager 118.

Figure 6:
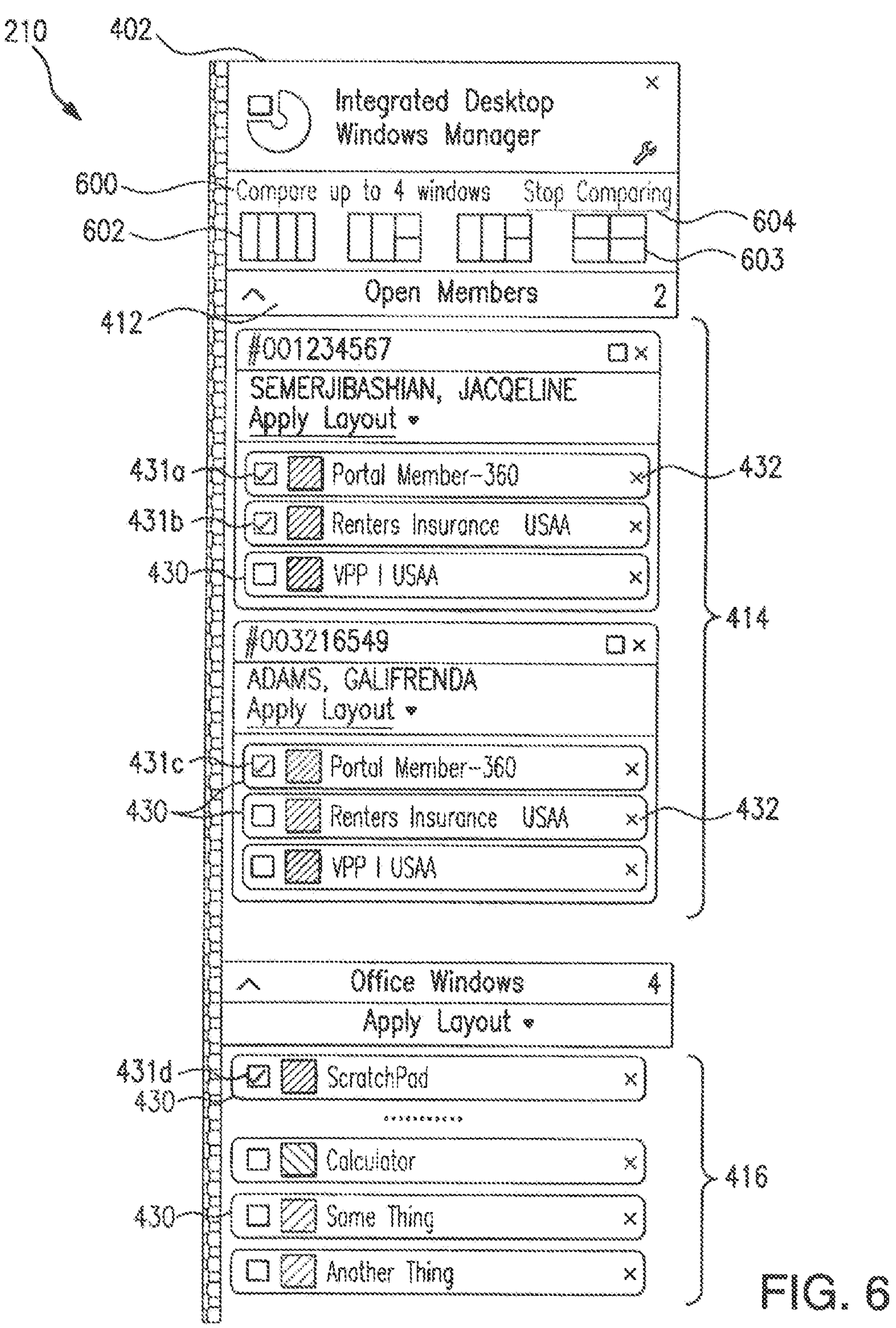
FIG. 6 is still another exemplary screen shot illustrating windows control tool's window comparison functionality in accordance with an exemplary embodiment.

FIG. 6 is still another exemplary screen shot illustrating desktop manager's 118 application window comparison functionality, in accordance with an exemplary embodiment. As shown in FIG. 6, the first window group section 414 and the second window group section 416 includes a plurality of window objects 430, each window object 430 representing one launched application. In one embodiment, in addition to having close icons 432, each window object 430 preferably includes a check box control 431 corresponding to the window object 430. At least in some embodiments, each check box control 431 may be presented substantially adjacent to information identifying respective application. According to an embodiment of the present invention, selection of a check box control 431 by a customer service representative causes the desktop manager 118 to enter a comparison mode (also referred to herein as a "multi-view" mode). In this comparison mode, the desktop manager 118 preferably maximizes application windows corresponding to window objects 430 selected by customer service representatives via respective check box controls 431*a*-431*d*. Advantageously, the desktop manager 118 may position these maximized windows on one or more displays corresponding to the representative's computing device 114 based on a particular comparison layout configuration which may be selected by a customer service representative.

As shown in FIG. 6, in one embodiment, UI component 210 of the desktop manager 118 may include a comparison layout configuration section 600 above the header 412 of the first window group section 414 and below the control tool header section 402. The comparison layout configuration section 600 may present to customer service representatives several available comparison layout configurations. In the example illustrated in FIG. 6, selection of a first comparison layout configuration 602 and selection of checkbox controls 431*a*-431*d* causes the desktop manager 118 to split the viewable area of one or more displays associated with the representative's computing device 114 into four adjacent vertical regions and causes the desktop manager 118 to position respective application windows into the created vertical regions from left to right. In one aspect, these application windows will be tiled across the screen in order in which they were selected. As another non-limiting example, selection of a fourth layout configuration 603 causes the desktop manager 118 to place respective application windows into respective quadrant regions of the one or more displays. In accordance with one embodiment, customer service representatives may exit comparison mode by clicking on "Stop Comparing" control 604 shown in FIG. 6. In response, the desktop manager 118 preferably restores all application windows (i.e. status and position) to the state they had prior to the desktop manager 118 entering the comparison mode.

Returning back to FIG. 3, at 322, the desktop manager 118 may determine whether the service representative clicked any of the check box controls 431. In response to determining that one of the check box controls 431 has been selected (step 322, yes branch), at 324, the desktop manager 118 preferably saves current states and positions of all application windows represented by window objects 430 within the first window group section 414 and the second window group section 416. At step 324, the desktop manager 118 preferably also enters the comparison mode described above with respect to FIG. 6.

Figure 7A:
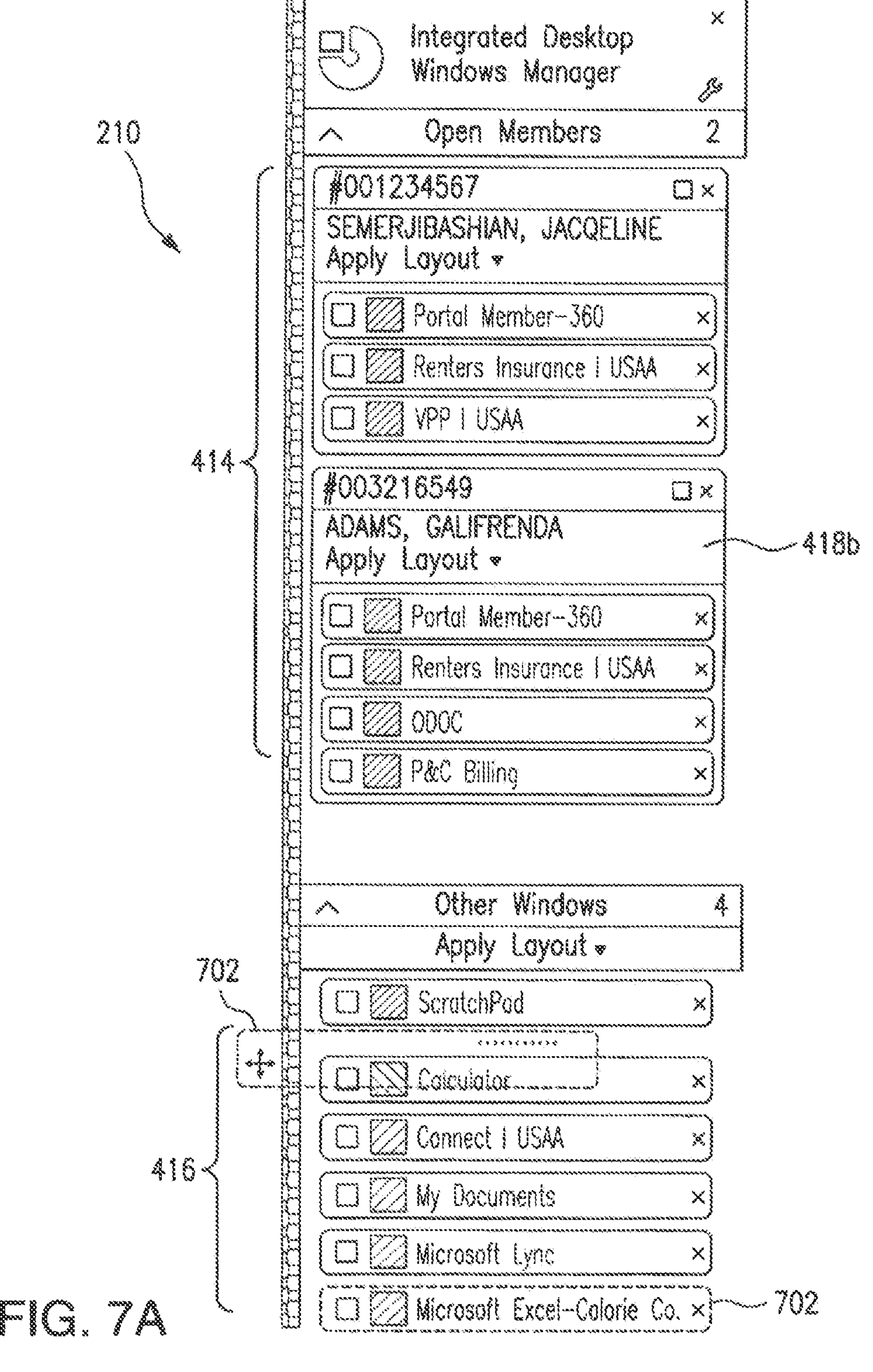
FIGS. 7A-7C are views of portions of the windows control tool of FIG. 5 illustrating drag-and-drop functionality in accordance with an exemplary embodiment.
Figure 7B:
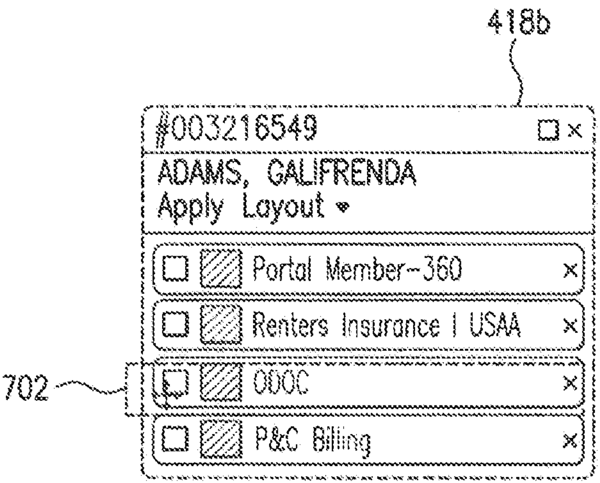
Figure 7C:
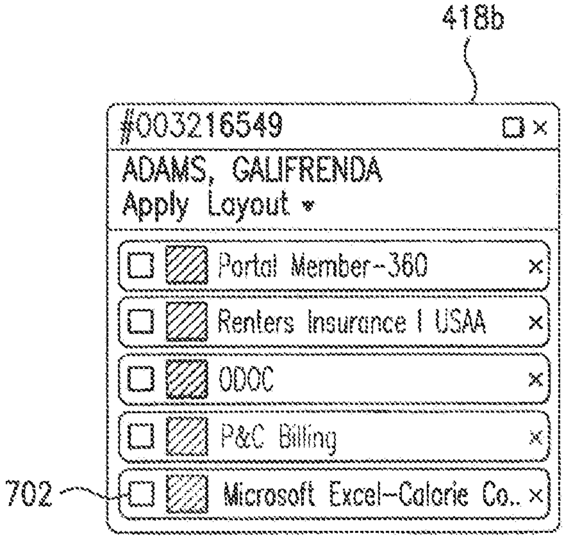

FIGS. 7A-7C are views of portions of the desktop manager's 118 UI component 210 of FIG. 5 illustrating drag-and-drop functionality, in accordance with an exemplary embodiment of the present invention. As shown in FIG. 7A, each of the first window group section 414 and the second window group section 416 may present a plurality of window objects. In some situations, customer service representatives may want to move at least some of these window objects from one section to another or from one subsection corresponding to one customer to another subsection corresponding to a different customer. According to an aspect of the invention, various embodiments of the desktop manager 118 may provide a drag-and-drop mechanism. As shown in FIG. 7A, the window object 702 (in this example a window object representing "Microsoft Excel" application) is dragged from the second window group section 416 onto a particular subsection of the first window group section 414 (in this example the subsection corresponding to the second customer having a second customer header 418*b*) and that subsection is selected as the drop target, as shown in FIG. 7B. FIG. 7C, illustrates the appearance of the subsection corresponding to the second customer after completion of the exemplary drag-and-drop operation.

Figure 8:
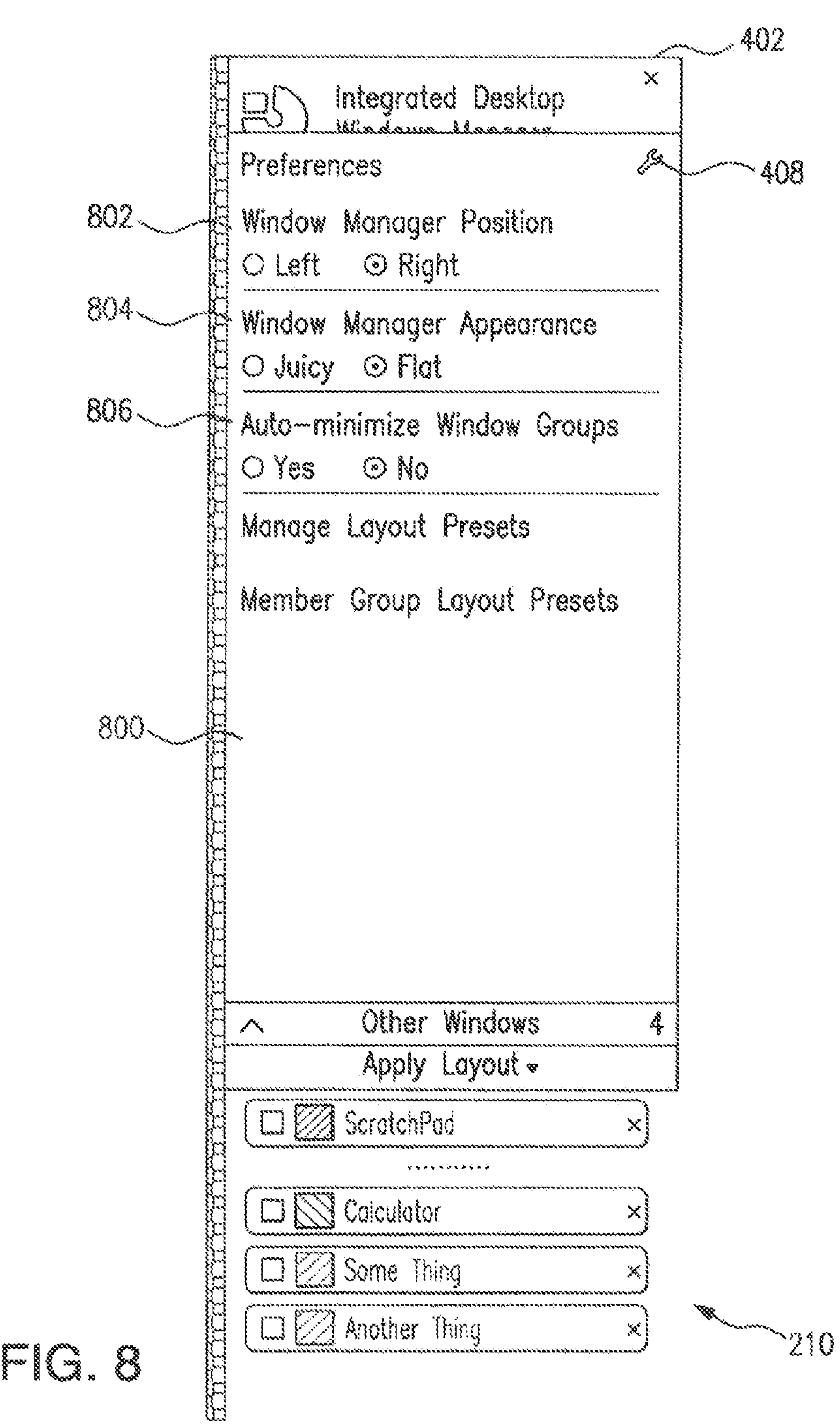
FIG. 8 is still another exemplary screen shot illustrating a process of setting windows control tool's preferences in accordance with an exemplary embodiment.

FIG. 8 is still another exemplary screen shot illustrating an exemplary desktop manager 118 preferences dialog box in accordance with an exemplary embodiment. In one embodiment, by clicking the user preferences icon 408 on the control tool header section 402, customer service representatives may control various settings/options related to appearance and/or functionality of the desktop manager's UI component 210. In accordance with an embodiment of the present invention, once the user preferences icon 408 is clicked by a customer service representative, the desktop manager 118 preferably displays a preferences dialog box 800, for example, on top of the first window group section 414, where the preferences dialog box 800 is to receive an input from the customer service representative. In the example illustrated in FIG. 8, the preferences dialog box 800 gives the customer service representative an option to specify a plurality of preferences. A first exemplary preference item 802 may be related to desktop manager's UI component's 210 position on the display, a second exemplary preference item 804 may be related to desktop manager's UI component's 210 appearance and a third exemplary preference item 806 may be related to functionality of the auto-minimize feature. It is noted that FIG. 8 is shown for illustrative purposes only, and is not meant to restrict the scope of the described aspect to any particular list of preferences.

In another aspect, various embodiments of the present invention contemplate that representative's company may create a plurality of service representative specific startup layouts that contain information related to applications needed to be launched whenever service representatives log onto their workstations prior to handling interactions with customers. In one exemplary embodiment, the startup layout may be related to time and attendance applications having a variety of functions that will be apparent to those individuals familiar with the payroll processing industry. For example, one or more attendance modules may process attendance data in connection with service representatives that "punch in" when beginning a shift work and "punch out" when the shift, or a portion thereof is completed. Advantageously, customer service representatives can quickly reload startup applications in one click, for example after taking a lunch break, simply by selecting the startup layout via desktop manager's UI component 210, as described above.

In yet another aspect, it is contemplated that some business area specific layouts may be customizable to control presentation of data in corresponding application windows. In some embodiments, depending on a type of interaction, such customizable layouts may present certain data in read-only format and/or may prevent customer service representatives from selecting a particular field and/or a particular interaction-specific menu option, for example.

As will be appreciated by one skilled in the art, aspects of the present invention may be embodied as a system, method or computer program product. Accordingly, aspects of the present invention may take the form of an entirely software embodiment. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
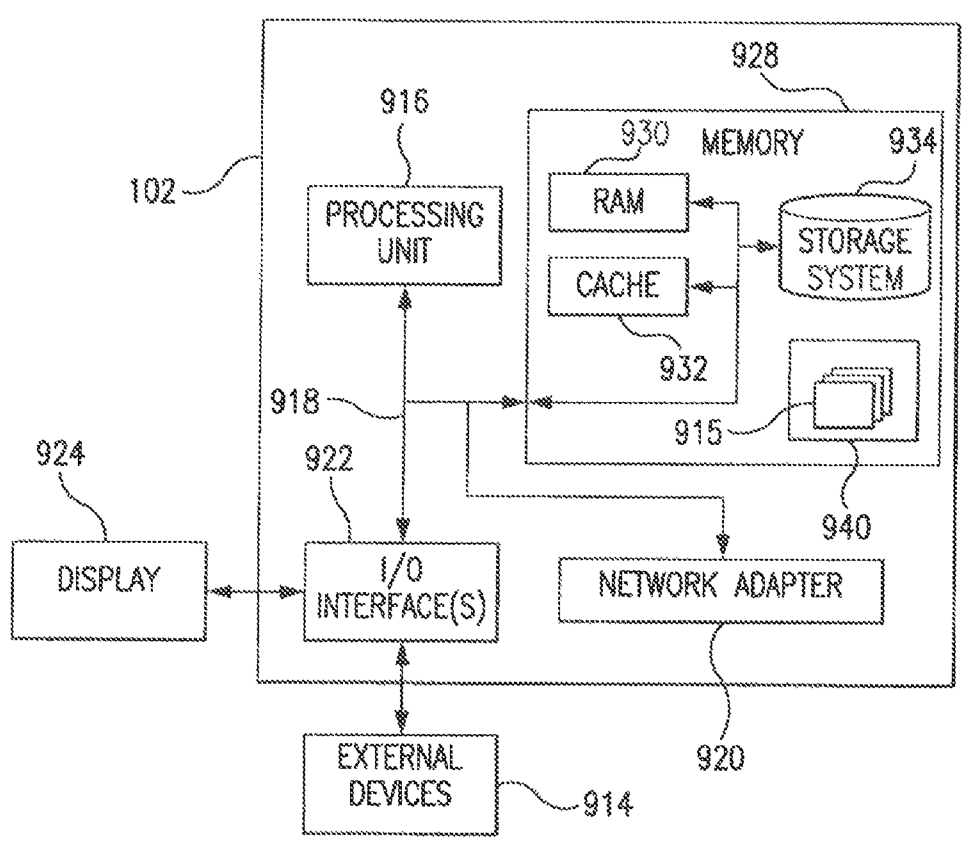
FIG. 9 illustrates a typical computing device that may be employed to implement at least some processing functionality in accordance with an exemplary embodiment of the present invention.

Embodiments of desktop manager control tool may be implemented or executed by "virtualized desktop" environments in centralized data center servers comprising one or more computer systems. One such centralized server 102 is illustrated in FIG. 9. In various embodiments, the centralized server 102 may be a server, a mainframe computer system, a workstation, a network computer, a desktop computer, a laptop, or the like.

Centralized server 102 having a "virtualized desktop" environment is only one example of a suitable system and is not intended to suggest any limitation as to the scope of use or functionality of embodiments of the invention described herein. Regardless, server 102 is capable of being implemented and/or performing any of the functionality set forth hereinabove.

Server 102 may be described in the general context of computer system-executable instructions, such as program modules, being executed by a computer system. Generally, program modules may include routines, programs, objects, components, logic, data structures, and so on that perform particular tasks or implement particular abstract data types. Server 102 may be practiced in distributed data processing environments where tasks are performed by remote processing devices that are linked through a communications network. In a distributed data processing environment, program modules may be located in both local and remote computer system storage media including memory storage devices.

Server 102 is shown in FIG. 9 in the form of a general-purpose computing device. The components of server 102 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server 102 typically includes a variety of computer system readable media. Such media may be any available media that is accessible by server 102, and it includes both volatile and non-volatile media, removable and non-removable media.

System memory 928 can include computer system readable media in the form of volatile memory, such as random access memory (RAM) 930 and/or cache memory 932. Server 102 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 915, such as tool launcher 116 and desktop manager 118, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 915 generally carry out the functions and/or methodologies of embodiments of the invention as described herein.

Server 102 may also communicate with one or more external devices 914 such as a keyboard, a pointing device, a display 924, etc.; one or more devices that enable a user to interact with server 102; and/or any devices (e.g., network card, modem, etc.) that enable server 102 to communicate with one or more other computing devices. Such communication can occur via Input/Output (I/O) interfaces 922. Still yet, server 102 can communicate with one or more networks such as a local area network (LAN), a general wide area network (WAN), and/or a public network (e.g., the Internet) via network adapter 920. As depicted, network adapter 920 communicates with the other components of server 102 via bus 918. It should be understood that although not shown, other hardware and/or software components could be used in conjunction with server 102. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for enhancing telephonic interaction simultaneously between a plurality of customers and a customer service representative of a company, the method comprising the steps of:

displaying a graphical user interface (GUI) of a windows control tool;

determining a plurality of telephonic conversation topics, wherein each respective determined telephonic conversation topic of the plurality of determined telephonic conversation topics is associated with a respective telephonic conversation between each customer of the plurality of customers and the customer service representative;

arranging one or more application windows corresponding to a plurality of launched applications associated with a respective customer of the plurality of customers on the GUI based on a display layout associated with a respective determined telephonic conversation topic for the respective customer of the plurality of customers, wherein the plurality of launched applications are grouped together for the respective customer on the GUI such that each application in a grouping for each respective customer is simultaneously displayed on the GUI;

wherein the display layout is at least one of an auto quoting layout, an auto service layout, an auto acquisitions layout, a renters layout, and a homeowners layout;

wherein the windows control tool is configured to control the one or more application windows based on input from the customer service representative and wherein the GUI of the windows control tool displays a plurality of window objects corresponding to the plurality of launched applications;

retrieving a predetermined layout from a layouts database, the predetermined layout describing layout details regarding a respective size and a respective screen position on the GUI of each of the one or more application windows, the predetermined layout being associated in the layouts database with a determined conversation topic of the plurality of determined telephonic conversation topics and being one of the auto quoting layout, the auto service layout, the auto acquisitions layout, the renters layout, and the homeowners layout;

wherein the customer service representative interacts simultaneously with a second plurality of customers that is a subset of the plurality of customers, each of the second plurality of customers being associated with a respective determined conversation topic of the determined telephonic conversation topics and each of the second plurality of customers being associated with a respective predetermined layout obtained from the layouts database;

each respective predetermined layout being associated in the layouts database with the respective determined conversation topic, and each respective predetermined layout describing the layout details regarding the respective size and the respective screen position on the GUI of each of the one or more application windows, each respective predetermined layout being one of the auto quoting layout, the auto service layout, the auto acquisitions layout, the renters layout, and the homeowners layout;

arranging a second plurality of launched applications for each customer of the second plurality of customers based on the respective predetermined layout associated with a second respective customer of the second plurality of customers and the respective determined conversation topic of the determined telephonic conversation topics associated with the second respective customer of the second plurality of customers within the GUI of the windows control tool, wherein each grouping of launched applications for the second respective customer is displayed separately within the GUI of the windows control tool.

2. The computer-implemented method as recited in claim 1, wherein each respective determined telephonic conversation topic of the plurality of determined telephonic conversation topics is determined based upon information related to the customer's browsing activity on a website associated with the company.

3. The computer-implemented method as recited in claim 2, wherein the plurality of launched applications are associated with the customer representative.

4. The computer-implemented method as recited in claim 3, further including:

determining an identity of each customer of the plurality of customers; and displaying in the plurality of applications information retrieved related to a determined identity associated with each customer of the plurality of customers.

5. The computer-implemented method of claim 1, wherein the GUI of the windows control tool comprises a control tool header section, a first window group section and a second window group section and wherein the first window group section comprises one or more window objects representing the plurality of launched applications and the second window group section comprises one or more window objects representing opened applications not associated with a customer of the plurality of customers.

6. The computer-implemented method of claim 1, wherein a first window group section comprises a first subsection including a first group of window objects that includes one or more launched applications associated with a first interaction with a first customer of the plurality of customers and a second subsection including a second group of window objects that includes one or more launched applications associated with a second interaction with a second customer of the plurality of customers.

7. The computer-implemented method of claim 5, wherein each of the control tool header section, first window group section and second window group section displays one or more group control icons.

8. The computer-implemented method of claim 7, wherein the one or more group control icons includes at least one of a minimize icon, a restore icon and a close icon, and wherein the one or more group control icons control a corresponding group of launched applications.

9. The computer-implemented method of claim 5, wherein each of the windows representing the plurality of launched applications includes a check-box control.

10. The computer-implemented method of claim 9, further including a step of activating a multi-view mode by the GUI of the windows control tool in response to the customer service representative selecting one or more of said check-box controls within one or more window objects representing the one or more launched applications and wherein activating the multi-view mode comprises maximizing all launched application windows corresponding to the selected window objects and minimizing all launched application windows corresponding to window objects displayed within the first window group section and the second window group section but not selected by the customer service representative.

11. A computer system for enhancing telephonic interaction simultaneously between a plurality of customers and a customer service representative of a company, comprising a memory configured to store instructions;

a processor disposed in communication with said memory, wherein said processor upon execution of the instructions is configured to:

display a graphical user interface (GUI) of a windows control tool;

determine a plurality of telephonic conversation topics, wherein each respective determined telephonic conversation topic of the plurality of determined telephonic conversation topics is associated with a respective telephonic conversation between each customer of the plurality of customers and the customer service representative;

retrieve and display information associated with each customer of the plurality of customers to be displayed on the GUI;

launch one or more applications associated with each respective determined telephonic conversation topic of the plurality of determined telephonic conversation topics for each of the plurality of customers based on a display layout associated with the respective determined telephonic conversation topic, wherein the one or more applications are grouped together for a respective customer on the GUI such that each application in a group for each respective customer is simultaneously displayed on the GUI;

wherein the display layout is at least one of an auto quoting layout, an auto service layout, an auto acquisitions layout, a renters layout, and a homeowners layout;

wherein the windows control tool is configured to control one or more application windows based on input from the customer service representative and wherein the GUI of the windows control tool displays a plurality of window objects corresponding to the one or more applications, retrieving a predetermined layout from a layouts database, the predetermined layout describing layout details regarding a respective size and a respective screen position on the GUI of each of a plurality of launched application windows corresponding to the one or more applications, the predetermined layout being associated in the layouts database with a determined conversation topic of the plurality of determined telephonic conversation topics and being one of the auto quoting layout, the auto service layout, the auto acquisitions layout, the renters layout, and the homeowners layout;

wherein the customer service representative interacts simultaneously with a second plurality of customers that is a subset of the plurality of customers, each of the second plurality of customers being associated with a respective determined conversation topic of the plurality of determined telephonic conversation topics and each of the second plurality of customers being associated with a respective predetermined layout obtained from the layouts database;

each respective predetermined layout being associated in the layouts database with the respective determined conversation topic, and each respective predetermined layout describing the layout details regarding the respective size and the respective screen position on the GUI of each of the plurality of launched application windows, each respective predetermined layout being one of the auto quoting layout, the auto service layout, the auto acquisitions layout, the renters layout, and the homeowners layout;

arranging a second plurality of applications for each customer of the second plurality of customers based on the respective predetermined layout associated with a second respective customer of the second plurality of customers and the respective determined conversation topic of the plurality of determined telephonic conversation topics associated with the second respective customer of the plurality of customers within the GUI of the windows control tool, wherein each grouping of launched applications for the second respective customer is displayed separately within the GUI of the windows control tool.

12. A computer system as recited in claim 11, wherein the display layout is predetermined by the customer service representative.

13. A computer system as recited in claim 11, wherein the processor is further configured to arrange on the GUI one or more application windows out of the one or more launched applications associated with the customer representative.

14. The computer system as recited in claim 11, wherein the processor is further configured to determine an identity of each customer of the plurality of customers engaged in a telephonic conversation with the customer service representative.

15. The computer system as recited in claim 11, wherein displaying information associated with each of the plurality of customers on the GUI further includes the program instructions to display a control tool header section, a first window group section and a second window group section and wherein the first window group section comprises one or more window objects representing the one or more launched applications and the second window group section comprises one or more window objects representing opened applications not associated with a particular customer of the plurality of customers.

16. The computer system as recited in claim 11, wherein the first window group section comprises a first subsection comprising a first group of window objects representing one or more launched applications associated with a first interaction with a first customer of the plurality of customers and a second subsection comprising a second group of window objects representing one or more launched applications associated with a second interaction with a second customer of the plurality of customers.

17. The computer system as recited in claim 11, wherein the determined telephonic conversation topic of the plurality of determined telephonic conversation topics is determined based upon information related to the customer's browsing activity on a website associated with the company.

* * * * *